Feb. 21, 1956    LE ROY H. ALFORD    2,735,097
SHINGLER'S HATCHET
Filed Nov. 16, 1953    4 Sheets-Sheet 1
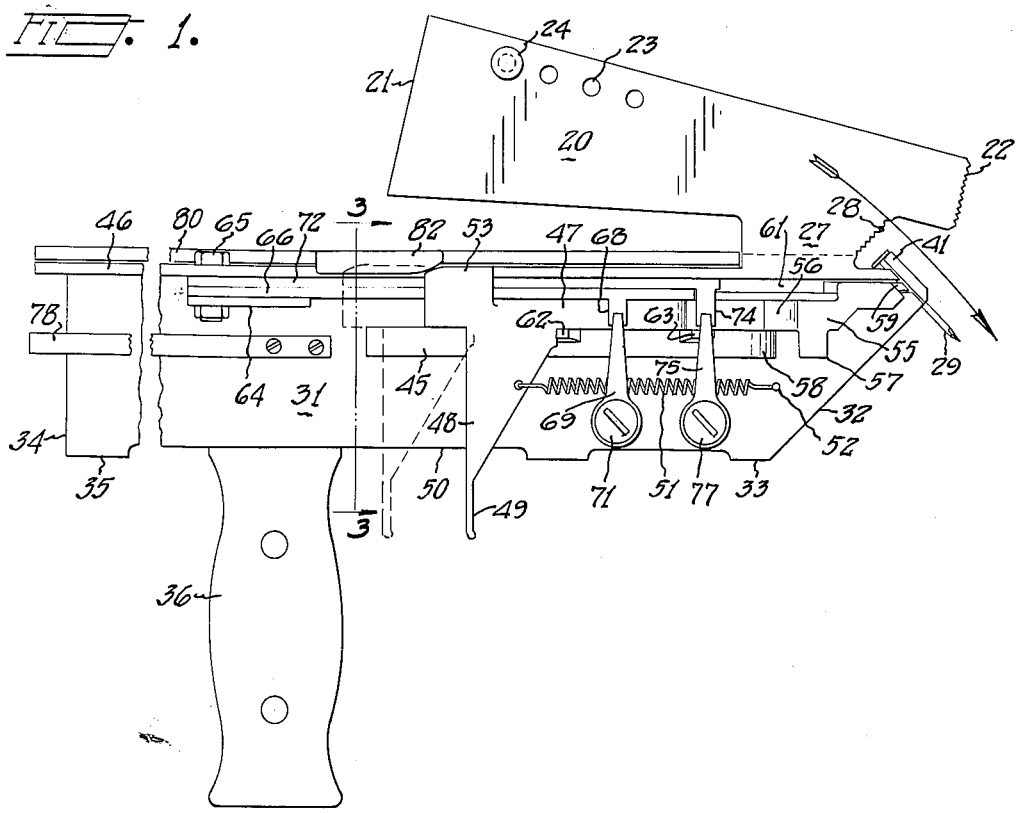
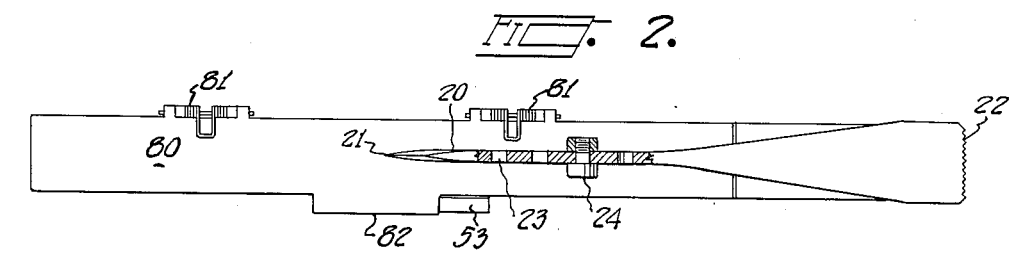
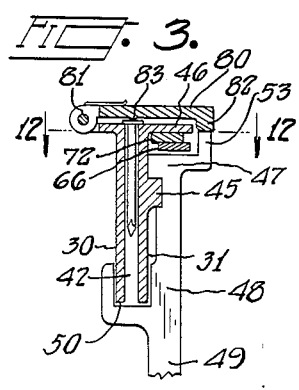
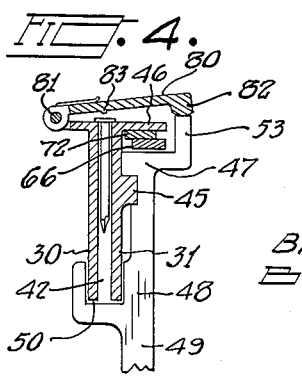
INVENTOR
LeROY HENRY ALFORD DEC'D
BY GRACE HILDA ALFORD ADMRX.
ATTORNEY

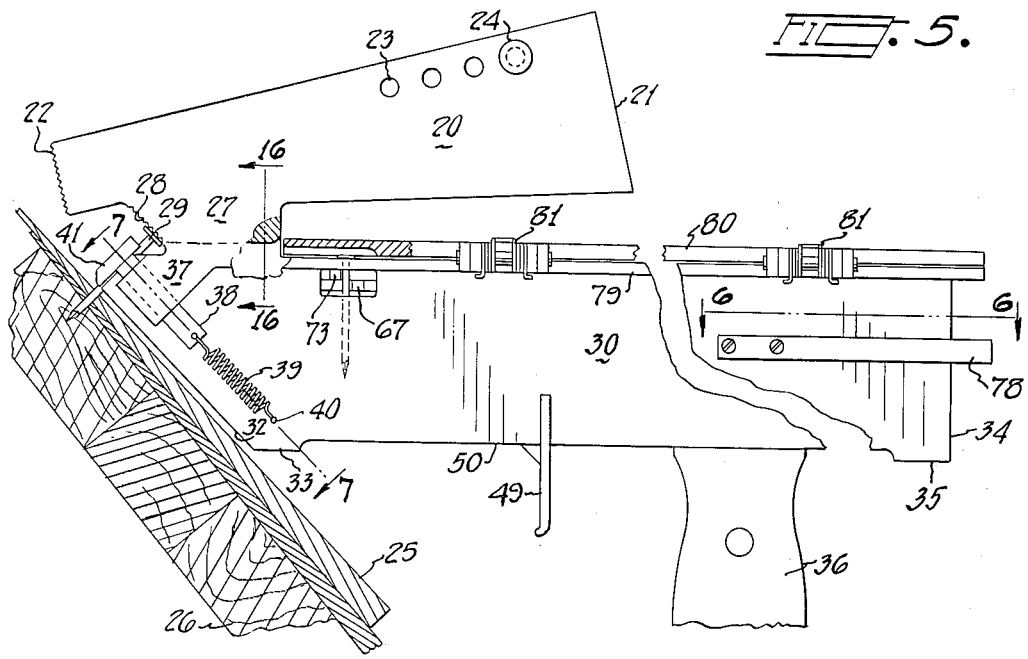

Feb. 21, 1956  LE ROY H. ALFORD  2,735,097
SHINGLER'S HATCHET
Filed Nov. 16, 1953  4 Sheets-Sheet 3
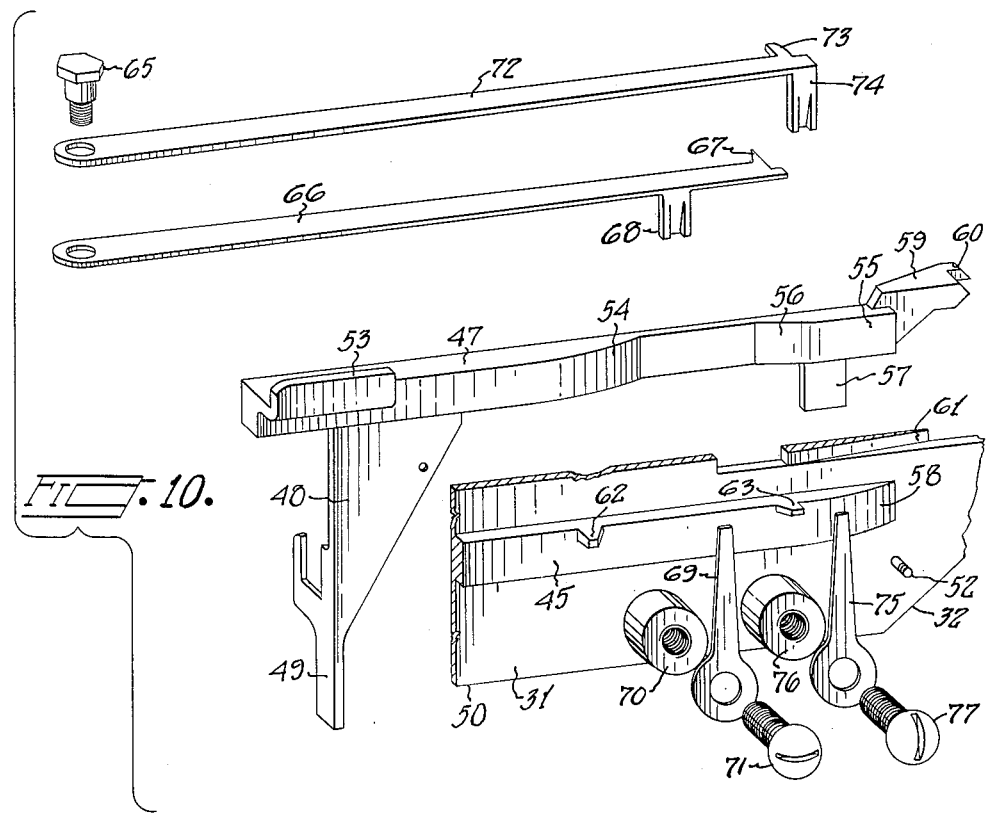
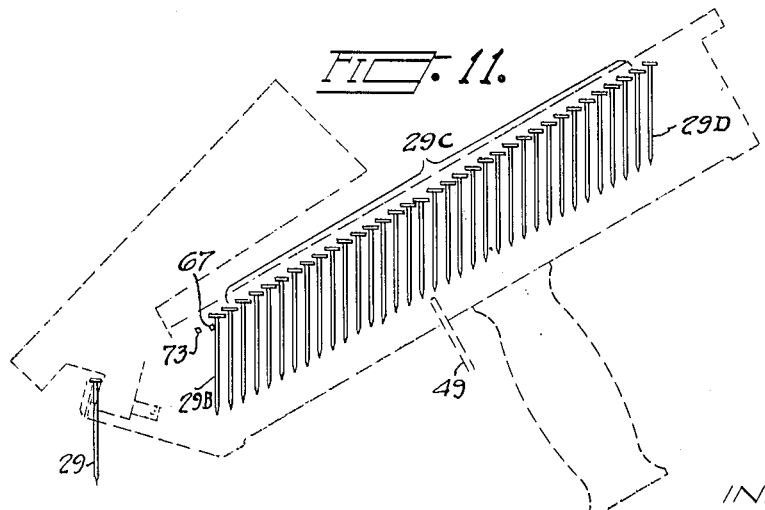
INVENTOR
Le ROY HENRY ALFORD, DEC'D
BY GRACE HILDA ALFORD ADMX
ATTORNEY Feb. 21, 1956  LE ROY H. ALFORD  2,735,097
SHINGLER'S HATCHET
Filed Nov. 16, 1953  4 Sheets-Sheet 4
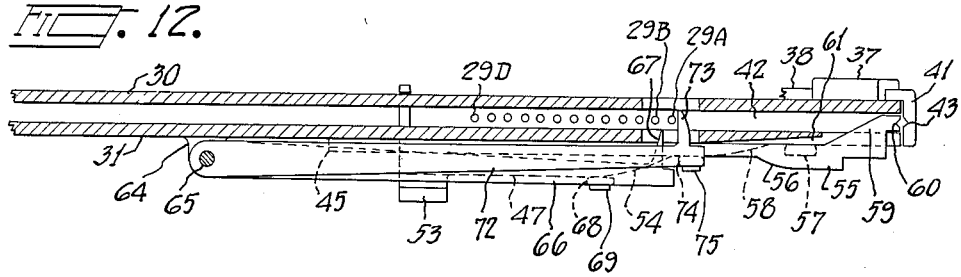
FIG. 12.
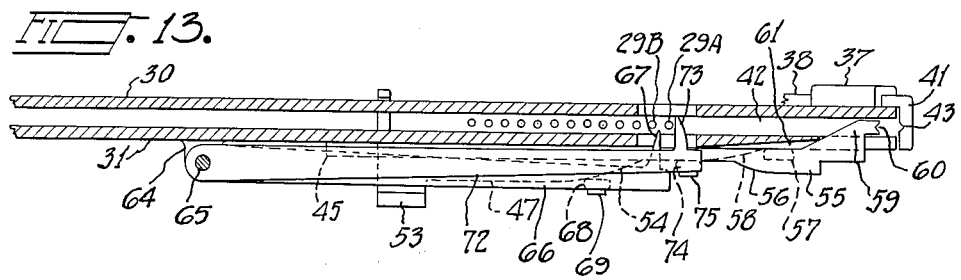
FIG. 13.
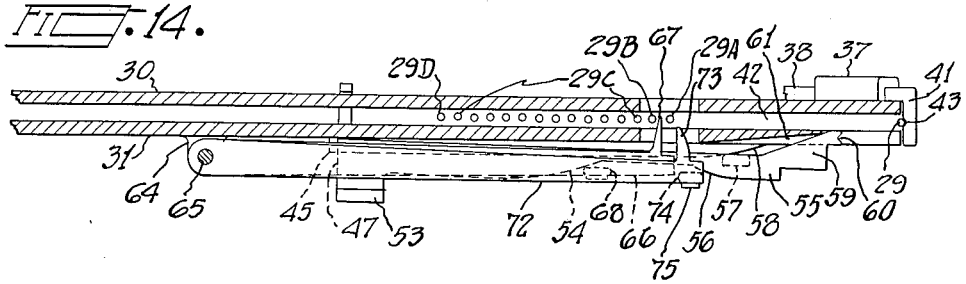
FIG. 14.
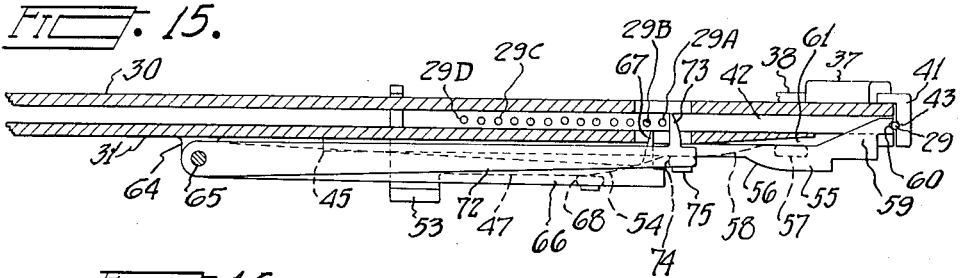
FIG. 15.
FIG. 16.
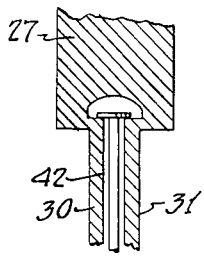
INVENTOR
LeROY HENRY ALFORD DEC'D
BY GRACE HILDA ALFORD ADMRX.
BY
ATTORNEY

United States Patent Office 2,735,097
Patented Feb. 21, 1956

2,735,097

SHINGLER'S HATCHET

Le Roy Henry Alford, deceased, late of Milwaukie, Oreg., by Grace Hilda Alford, administratrix, Milwaukie, Oreg.

Application November 16, 1953, Serial No. 392,364

3 Claims. (Cl. 1—45)

This invention relates generally to nail driving machines and particularly to a shingler's hatchet having a nail feeder incorporated therein.

The main object is to produce a hatchet which is especially adapted for shingling purposes.

The second object is to so construct the hatchet that the user does not touch the nails as they are automatically fed to the driving head.

The third object is to so construct the feed mechanism that it will function perfectly under all conditions.

The fourth object is to overcome the shinglers' objection to the use of coated nails and dipped shingles, as the nails are not held in the mouth of the shingler.

These results are accomplished in the manner set forth in the following specification as illustrated in the accompanying drawings in which Fig. 1 is a side elevation of the device.

Fig. 2 is a plan view of Fig. 1.

Fig. 3 is a section taken along the line 3—3 in Fig. 1, showing the top cover plate touching the nail heads and the trigger is in a full line position shown in Fig. 1.

Fig. 4 is similar to Fig. 3 except showing the cover raised to release the nails when the trigger is moved toward the dotted position shown in Fig. 1, thus permitting the nails to slide toward the front end with the device held nose down as indicated in Fig. 11.

Fig. 5 is an elevation of the device looking at the side opposite the one shown in Fig. 1, also showing a nail partially driven or started into the shingle.

Fig. 6 is a section taken along the line 6—6 in Fig. 5.

Fig. 7 is a section taken along the line 7—7 in Fig. 5.

Fig. 8 is similar to Fig. 7 but showing how the device is released from a partially driven nail.

Fig. 9 is a perspective view of the cover plate as viewed from below.

Fig. 10 is an exploded view of the nail feed mechanism and a fragment of the side plate.

Fig. 11 is a diagram showing the device in dotted lines and nails in full line. This figure corresponds to the diagram in Fig. 14, which indicates that the device must be tilted to cause the nails to slide under control of the fingers A and B.

Fig. 12 is a fragmentary section taken along the line 12—12 in Fig. 3 and shows the relation of the parts just after the device has been released from a partially driven nail, as indicated in Fig. 8.

Fig. 13 is similar to Fig. 12 but showing the slide illustrated in Fig. 10 partially pulled back and the restraining or separating finger beginning to enter the space between the first two nails.

Fig. 14 is similar to Fig. 13 but showing the slide fully retracted and releasing point or finger moved outwardly, permitting the nail to pass and, as shown in Fig. 4, the cover plate is up at this time.

Fig. 15 is similar to Fig. 14 but showing a nail clamped in a driving position while the reserve nails are moved up one space. This corresponds to Fig. 1.

Fig. 16 is a section taken along the line 16—16 in Fig. 5 to show a tunnel through the hatchet to permit the nail to pass.

Like numbers of reference refer to the same or similar parts throughout the several views.

Referring in detail to the drawings there is shown in Fig. 1 a blade 20 of a shingler's hatchet having the usual cutting edge 21 and a roughened nail driving head 22 at the opposite end thereof. The blade 20 has formed therein a series of holes 23 into which may be inserted the stop plugs 24 for gauging the weather side of the shingle 25 which is laid on the sheathing of the roof boards 26.

On one edge of the hatchet is formed a shank 27 which has formed on the forward side thereof a roughened surface 28 for starting a nail 29 preparatory to driving it into the shingle 25 by means of the head 22.

The frame of the device is comprised of a U-shaped channel whose side plates 30 and 31 are united at the bevelled forward end 32 by a strap 33 and at the rearward end 34 by a strap 35. The space between the straps 33 and 35 constitutes an elongated slot. A handle 36 is rigidly secured to the side plates 30 and 31 and normal to the length of the side plates and disposed near their rearmost ends and in the same plane as are the side plates 30 and 31.

The side plate 30 has formed on the outer side of the end 32 a guide 37 in which is mounted a slide 38 which is urged backward by the spring 39 which is anchored to the pin 40. On the slide 38 is secured a nail holding finger 41 which is turned laterally over the slot 42 between the side plates 30 and 31. The finger 41 has a nail groove 43 formed therein which receives the endmost nail 29 and holds it ready for starting into the shingle 25. The side plate 31 has secured thereon a guide 45 between which and the flanged edge 46 of the side plate 31 is slidably mounted the slide 47 which is provided with a downturned trigger arm 48 which terminates in a trigger 49 which extends beyond the edge 50 of the side plates 30 and 31 between the straps 33 and 35. A tension spring 51 is secured between the trigger arm 48 and the anchor pin 52 which is mounted on the forward end of the side plate 31.

On the rearmost end of the slide 47 is formed the upturned cover raising cam 53. Near the middle of the length of the slide 47 is a nail separating cam 54. Between the cam 54 and the slide end 55 is a nail releasing cam 56. A lug 57 extends downwardly from the slide end 55 and rides on the cam 58 formed on the forward end of the guide 45. It does this when the slide 47 is drawn backwardly by the trigger 49.

Projecting forwardly and laterally from the end 55 is a nail feeding finger 59 in which is formed a nail groove 60. The foremost end of the side plate 31 is cut away to form an inclined slot 61 which cuts entirely through the side plate 31 and permits the feeding finger 59 to move within the slot 42 when the trigger 49 is in a foremost position.

On the guide 45 is a stop lug 62 which limits the forward movement of the trigger arm 48. Also formed on the guide 45 is a stop 63 which limits the backward movement of the slide 47 by engagement with the lug 57. Near the rear end of the side plate 31 and spaced from the flange 46 is a lug 64. A bolt 65 extends through the lug 64 and flange 46. Pivoted on the bolt 65 is the nail separating arm 66 having a point 67 formed at its opposite end, which point is normally held out of the slot 42 by the cam 54 against which rides the lug 68 formed on the arm 66. A flat spring 69 is mounted on the post 70 on the side plate 31 and this spring is held in place by a screw 71 which extends into the post 70. The spring 69 urged the lug 68 against the cam 54.

Also pivoted on the bolt 65 is a nail releasing arm 72 on whose forward end is formed a nail releasing point 73 and a cam lug 74 which engages the flat spring 75 which is secured on the post 76 by a screw 77.

There is also provided a pair of bayonet prongs 78 on the rear end of the device for attachment of a magazine, which forms no part of the present invention and will not be explained herein.

On the flange 79 is formed a cover plate 80, one side of which is joined by the spring hinges 81 to the flange 79 and the other side having a depending shoe 82 which rides on the cover raising cam 53 when the slide 47 is drawn backwardly. The under side of the cover plate 80 has formed thereon a rib 83 which is thicker at the rearmost end. The purpose of this construction is to prevent the nails from being thrown out in handling or in actual use. The purpose of making the rib 83 thicker at the rearmost end is because it will insure the holding of the rearmost nail 29D. Obviously a rubber strip or serrated member could be used in place of the rib 83.

For the purpose of explaining the operation, the nail position has been referred to as 29 when in position ready for starting the drive, whereas the first nail in the magazine is referred to as 29A, the second nail as 29B and all of the following nails 29C except the last nail which is 29D.

The operation of the device is as follows: Let it be assumed that the nails 29A to 29D have been placed in the tunnel or slot 42 and the trigger 49 pulled back as shown in dotted lines in Fig. 1. This corresponds to the position shown in Fig. 14, in which the point 67 is forced between the first two nails 29A and 29B and the first nail 29A is permitted to escape into the inclined slot 42 where it moves by gravity against the nail holding finger 41 where it now becomes nail 29. As the trigger 49 is released, as shown in Fig. 15, the nail feeding finger 59 moves forwardly and inwardly into slot 42, holding the nail 29 firmly against the finger 41.

The user of the implement now strikes a blow with the head of the nail 29 against the roughened surface 28 (Fig. 5), causing the nail to be started through the singles 25 into the roof board 26. The operator then exerts a slight backward pull on the device, causing the nail holding finger 41 to be withdrawn as shown in Fig. 8 and to be released from the nail by a lateral movement of the device. The free hatchet is then brought down a second time, this time with the head 22 engaging the nail 29 which is surely driven home by a single blow. The following movements are all in orderly sequence: that is, the nails move through to the position shown in Fig. 12 where the point 73 stops the endmost nail and later the endmost nail 29A is separated from the group as shown in Fig. 14 from whence it passes to the driving position as shown in Fig. 15.

As previously stated, the purpose of the hinged cover plate 80 is to hold the nails 29A to 29D within the slot 42 during the nailing operation and permitting their movement along the nail race formed by the side plates 30 and 31 only when a nail is being fed to a driving position.

The finger 59 is referred to as a feeding finger. In its true sense it might be regarded as a nail stabilizing finger as the actual feeding to the nailing point is done by gravity as stated.

It will be understood that the only purpose of the sloping bottom slot 61 is to cause the finger 59 to move into the passageway 42 in order to clamp the nail 29 and then to move out of the way when the trigger and slide 47 are pulled rearwardly.

I claim:

1. A hammer having a driving head formed thereon, a nail feeder attached to said head and forming an elongated slot constituting a nail raceway, the nail raceway terminating at its forward end under the driving head, a nail holding finger mounted on the feeder and extending retractably across the forward end of said raceway for releasably holding a nail in position under the driving head, the nails being suspended by their heads through said slot, a trigger movable on the nail feeder, nail dispensing means operable by the trigger for dispensing nails individually toward the nail holding finger, a cover plate mounted retractably on the nail feeder and normally engaging the heads of nails in the raceway to prevent displacement of the nails during operation of the hammer, and means operable by the trigger for raising the cover plate out of contact with the nail heads when the dispensing means is dispensing a nail to the nail holding finger.

2. A hammer comprising a pair of spaced side plates forming a raceway for nails, the heads of said nails being suspended by said plates, a cover plate hinged to a side plate and having means for normally engaging the heads of the nails suspended between said side plates to prevent displacement of the nails during operation of the hammer, a trigger operated slide mounted movably on one of said side plates, said slide having nail separating and nail releasing cams formed thereon, a nail separating arm hinged to one of said side plates and having a point thereon retractably intersecting said raceway and actuated by said separating cam, a nail releasing arm also hinged on one of said side plates and having a nail releasing finger normally obstructing said raceway in front of said separating finger, said separating and releasing fingers being operated in alternate succession, a nail stabilizing finger on said slide for retractable insertion into said raceway in front of the releasing finger, and cam means on the slide and cover plate for raising the cover plate out of contact with the nails when the slide is moved to retract the nail releasing finger and nail stabilizing finger.

3. A hammer comprising a body forming a nail raceway, releasable nail holding means at the forward end of the raceway, a driving head mounted on the body and positioned adjacent the nail holding means for engaging the head of a nail to be driven, nail releasing finger means mounted movably on the body for removable entrance with the raceway, nail separating finger means mounted movably on the body for removable entrance into the raceway a distance of one nail rearwardly of the nail releasing finger means, nail stabilizing means mounted movably on the body for removable entrance into the raceway adjacent the nail holding means for releasably securing a nail therebetween, a cover plate hinged to the body and positioned above the raceway for releasable engagement with the heads of nails contained in the raceway, whereby to prevent displacement of the nails during operation of the hammer, and actuator means mounted movably on the body and engaging the nail releasing, separating and stabilizing means and cover plate, the actuator means being arranged, in one direction of movement, to retract from the raceway the nail releasing finger means and nail stabilizing means and to project into the raceway the nail separating finger means and to move the cover plate out of engagement with the nail heads, and in the opposite direction of movement to reverse said actions.

References Cited in the file of this patent

UNITED STATES PATENTS

| | | |
|---|---|---|
| 1,609,592 | Williams | Dec. 7, 1926 |
| 2,630,567 | Alford | Mar. 10, 1953 |